United States Patent [19]

Fox

[11] 4,407,469

[45] Oct. 4, 1983

[54] ATTITUDE CONTROL SYSTEM FOR SPACECRAFT UTILIZING THE THRUSTER PLUME

[75] Inventor: Stephen M. Fox, Belle Mead, N.J.

[73] Assignee: RCA Corporation, New York, N.Y.

[21] Appl. No.: 249,607

[22] Filed: Mar. 31, 1981

Related U.S. Application Data

[63] Continuation of Ser. No. 68,502, Aug. 22, 1979, abandoned.

[51] Int. Cl.$^3$ .............................................. B64G 1/26
[52] U.S. Cl. ....................................... 244/169; 244/52
[58] Field of Search ................... 244/169, 173, 158 R, 244/172, 164, 168, 52

[56] References Cited

U.S. PATENT DOCUMENTS

| | | | |
|---|---|---|---|
| 2,395,809 | 3/1946 | Goddard | 244/52 |
| 2,850,977 | 9/1958 | Pollak | 244/52 |
| 2,919,544 | 1/1960 | Smith, Jr. et al. | 244/52 |
| 2,926,869 | 3/1960 | Sullivan | 244/52 |
| 3,206,141 | 9/1965 | Dryden | 244/169 |
| 3,231,223 | 1/1966 | Upper | |
| 3,866,025 | 2/1975 | Cavanagh | 244/169 X |
| 3,907,226 | 9/1975 | Neufeld et al. | 244/169 |
| 3,984,071 | 10/1976 | Fleming | 244/169 |

OTHER PUBLICATIONS

Sansevero et al., "On-Orbit Performance of the Hydrazine Reaction Control Subsystem for the Communications Tech. Sat.", AIAA/SAE 14th Joint Prop. Conf. 7-1978.

Baerwald, "Rocket Exhaust Plume Impingement on the Voyager Spacecraft", AIAA/SAE 14th Prop. Conf., 7-1978.

Ramirez et al., "Analysis of Exhaust Plume Impingement on a Navigational Sys. Sat.", 1979 JANNAF Prop. Meet. 3-1979.

*Fundamentals of Gas Dynamics,* Edited by Emmons, 1958, pp. 698, 702.

*Primary Examiner*—Galen L. Barefoot
*Attorney, Agent, or Firm*—J. S. Tripoli; R. L. Troike

[57] ABSTRACT

An attitude control system for spacecraft having thrusters utilizes the exhaust plume of the thrusters for attitude control. At least one of the thrusters is canted so that its reaction line of thrust, when misaligned with one of the spacecraft's primary axes; causes a control torque to develop about said axis which aids the plume torque about said axis resulting from the plume of the one thruster impinging on a surface such as that of a solar panel on the spacecraft.

5 Claims, 9 Drawing Figures

4,407,469

ATTITUDE CONTROL SYSTEM FOR SPACECRAFT UTILIZING THE THRUSTER PLUME

This is a continuation of application Ser. No. 068,502 filed Aug. 22, 1979, now abandoned.

This invention relates to attitude control of satellites using thrusters to develop control torques.

Satellites which require jets or thrusters utilizing expelled fluids such as monopropellant hydrazine ($N_2H_4$) for orbit adjustments and attitude control, have surfaces on the satellite such as the antennas, solar panels and other satellite components that are located within the exhaust plume of the jets. Plume impingement on any of these surfaces will cause disturbance torques which must be absorbed or controlled through the attitude control system of the satellite. The effects of the plume are considered in conventional design of satellites a disturbance requiring additional fuel for the expected satellite mission life.

For more detailed discussions of the effects of the plume field on attitude control systems see the following papers: "On-Orbit Performance of the Hydrazine Reaction Control Subsystem for the Communications Technology Satellite," V. J. Sansevero et al., *AIAA/SAE 14th Joint Propulsion Conf.*, Las Vegas, Nev., July 25-27, 1978, Paper No. 78-1061; "Rocket Exhaust Plume Impingement on the Voyager Spacecraft," R. K. Baerwald, *AIAA/SAE 14th Propulsion Conf.*, Las Vegas, Nev., July 25-27, 1978, Paper No. 78-1090; and "Analysis of Exhaust Plume Impingement on a Navigational System Satellite," P. Ramirez et al., 1979 *JANNAF Propulsion Meeting*, Anaheim, Calif., Mar. 7, 1979.

It appears that, in the absence of eliminating the effects of plume on a satellite during the operation of its thrusters, a satellite system which can utilize the plume effects beneficially in the control system is highly desirable.

According to the invention, the thrusters of a satellite are arranged to produce a plume torque such that the total or net torque on the satellite for any given attitude control maneuver is caused by the control torque, if any, aiding the plume torque.

Figure 1:
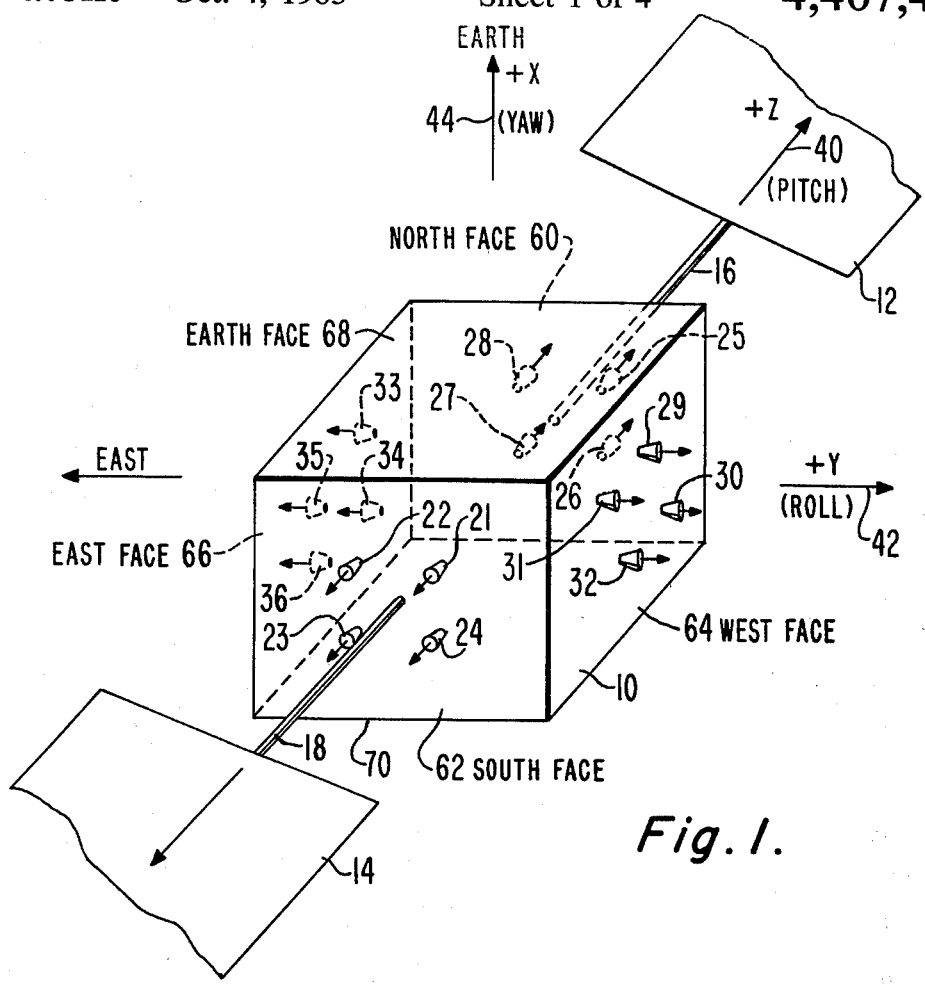
FIG. 1 is a schematic of the structure of a satellite provided with solar array panels and a plurality of thrusters.

Conventional satellite 10 as shown in FIG. 1 is provided with a structure such as a pair of solar array panels 12 and 14 connected to respective solar array drive shafts 16 and 18 driven by suitable motor systems, not shown. A plurality of thrusters, namely thrusters 21-36 inclusive, are positioned on the spacecraft to effect various thruster torque combinations to achieve any attitude control or orbit adjust maneuver required. A suitable system for controlling such thrusters is disclosed in U.S. Pat. No. 3,866,025, issued on Feb. 11, 1975, to J. P. Cavanaugh, entitled "Spacecraft Attitude Control System." Control components such as the computer, control gyros and sensors are described in detail in the aforesaid Cavanaugh patent. Accordingly, further description or details of such a system control and control components are not given.

The respective panels of the spacecraft 10 are designated, for convenience, for a geosynchronous spacecraft to correspond to the directions of the earth over which the satellite is orbiting. Thus, as shown in FIG. 1, the spacecraft is oriented such that the yaw axis 44 (+x) is pointing to the earth, the roll axis 42 (+y) is opposite to the direction of the velocity vector of the spacecraft in the orbit and the pitch axis 40 (+z) is perpendicular to the orbit normal. As shown, for example, in FIG. 6, the yaw, roll and pitch axes pass through the center of mass (39, FIG. 6) of the spacecraft. These can be considered the primary control axes of the spacecraft. Accordingly, the pitch axis is parallel to the spin axis of the earth and is pointing in a parallel direction to the earth axis towards the north pole. Panel 60 is thus conveniently designated the north face of the satellite, face 62 the south face, face 64 the west face, and face 66 the east face. Moreover, face 68 is the earth facing panel and face 70 is the "anti-earth" panel, that is, the panel facing away from the earth.

The thrusters 29-32 and 33-36 mounted on the west face 64 and east face 66, respectively, provide control jets whose plumes do not cause substantial disturbance torques on surfaces of the spacecraft 10. However, in the prior art, the plumes of thrusters 21-24 and 25-28 on the south and north faces 62 and 60 cause torques termed "disturbance torques" on the solar panels 12 and 14.

The spacecraft 10 is assumed to be in orbit and oriented such that the pitch axis 40, the roll axis 42 and the yaw axis 44 are as shown in FIG. 1.

Figure 2A:
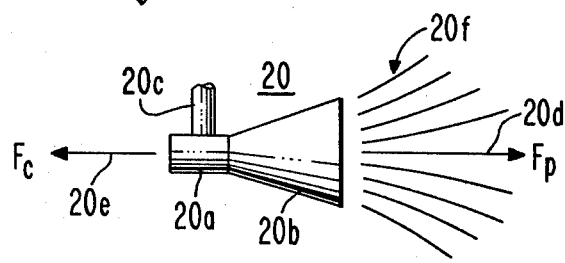
FIGS. 2a, 2b and 2c are schematic diagrams representing a typical thruster used in the practice of the invention.

FIG. 2a is a schematic diagram of an illustrative conventional thruster 20 of any one of the group of thrusters 21-36. Thruster 20 has a chamber 20a and a nozzle 20b. Fluid for producing the jet from the nozzle is provided via conduit 20c under control of the thruster control system, not shown. The exhaust jet is designated the thruster exhaust plume or, simply, plume. The plume expands as indicated by the plurality of lines 20f in accordance with the geometry of the thruster and the characteristics of the expanding gas.

Each thruster produces a control torque which is defined as the cross product of the thrust force with the moment arm (distance) of the thruster relative to the center of mass of the spacecraft or the primary control axis about which the torque is being developed. The plume may impinge on the surface of the solar array (12, 14) and produce a plume torque which is produced by the plume pressure forces integrated over the entire area of the array relative to the center of mass of the spacecraft. Force line 20d represents this total plume force $F_p$ and is assumed to act along the longitudinal axis of nozzle 20b. It should be understood that, in practice, only a fraction of the force $F_p$ will cause a torque on the surface of interest. The effective force causing such a torque is designated herein as $F'_p$. The reaction of the expulsion of the jet fluid from thruster 20 is a control force 20e designated $F_c$. The control force $F_c$ is conventionally considered the force used to control the satellite while the plume force $F'_p$ is conventionally considered a disturbance force. In systems embodying the present invention, at least some of the thrusters are canted to provide plume forces which are used to advantage.

Figure 2B:
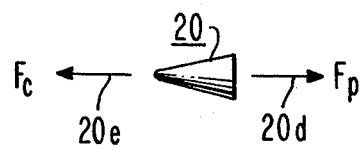
Figure 2C:

For convenience, thruster 20 is simplified schematically as shown in FIGS. 2b and 2c and, as such, will be used in the several other drawing figures in which thrusters 21–36 are illustrated.

Figures 3, 4:
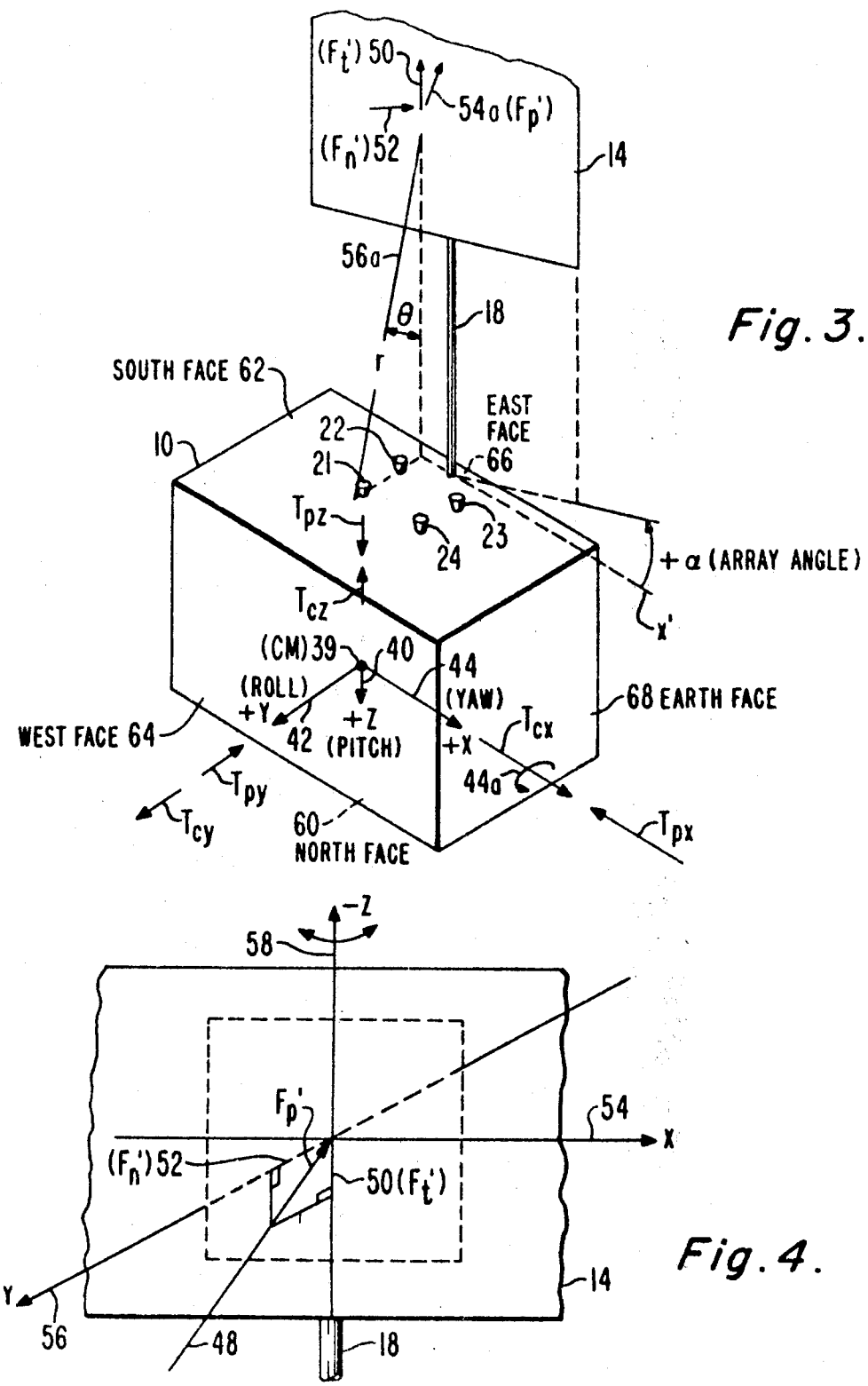
FIG. 3 is a schematic of the structure of another spacecraft and the geometric relationship of several thrusters to one solar array panel to illustrate the thruster exhaust plume effect.
FIG. 4 is an enlarged schematic of a portion of a solar panel shown in FIG. 3 illustrating the resolution of the plume velocity vector on the solar array surface.

For a description and understanding of the plume effect of concern to the present invention, certain geometrical relationships of the spacecraft 10 to solar array panels 12 and 14 are described. As shown in FIG. 3, solar array panel 14 is supported by shaft 18. The array panel 14 is at an angle $\alpha$ (alpha) with axis x', which is parallel to yaw (x) axis 44. The net plume field effect from thruster 21, that is, force $F'_p$ at angle $\theta$ (theta) through the distance r, is represented by the reference numeral 56a.

The plume force $F'_p$ being a vector may be resolved into a tangential component ($F'_t$) 50 and a normal component ($F'_n$) 52 as seen better in FIG. 4. The coordinate axes 54, 56 and 58 are the respective x, y and z coordinate axes of the solar array panel and are parallel with the spacecraft 10 axes (40, 42, 44) which are illustrated in FIG. 3. Unless the force vector $F'_p$ or its components passes through the center of mass 39, a moment will be generated based on the magnitude of those forces and the respective moment arms relative to the respective spacecraft axes. The resolution of the force $F'_p$ into its components $F'_n$ normal to the panel, and $F'_t$ tangential to the panel, may be determined from known free molecular gas flow dynamics as described, for example, in *Fundamental of Gas Dynamics*, (Vol. III, High Speed Aerodynamics and Jet Propulsion), by H. W. Emmons (Editor), Princeton University Press, 1958. In particular, equations 7.6 and 7.7 described on page 702, provide a basic relationship from which the plume impingement forces and subsequent induced disturbance torques can be determined.

The control forces $F_c$ from the thrusters as well as the plume force $F'_p$ will develop certain torques about one or more of the spacecraft axes (40, 42, 44) depending on the direction of the force and the moment arm, if any, to the axes.

As seen in FIG. 3, thruster 21 will be used to illustrate the effect of the exhaust plume on torques effected on the spacecraft axes 40, 42 and 44. Thruster 21, in operation, generates a plume force $F_p$ which will have a component $F'_p$ acting on the surface of solar panel 14. In this example, the angle at which the plume force acts on the panel, namely angle $\theta$, is determined by the length, location and orientation of the shaft 18 of the array 14. In general, the effect of the plume forces is reduced as the panel is located in a more remote position relative to the thruster. This effect is essentially a function of the reduced density of the plume as the distance to the panel surface from the thrusters increases. The plume of the thruster 21 develops a control $F_c$ that can develop torques about the x, y and z axes represented as Tcx, Tcy and Tcz. The respective torques being vector quantities and using the right-hand convention of the art, the arrowhead of the respective torque vectors indicate the direction in the positive sense about which the torque acts. Thus, for the vector Tcx the torque is understood to be acting on the x (yaw) axis in the direction of arrow 44a.

The torques generated by the plume force $F'_p$ acting through the respective moment arms to each of the axes are represented by Tpx, Tpy and Tpz, opposing the control torques. In general, the control forces from the thrusters and the plume forces resulting therefrom will generate torques about each of the spacecraft axes x, y and z, if the thruster is mounted on axes other than the principal axes x, y and z. It should be understood that if a thruster is positioned to act through a particular body axis, no torque will be developed about that axes.

It is seen thus that depending upon the location of the thruster, and the relative position of the solar panel 14, as represented by the angle $\alpha$, and the angle $\theta$ of incidence of the plume, there will be a disturbance force by the plume of the thrusters that opposes and makes difficult attitude control or orbit adjust operations. Furthermore, a system with such plume disturbances tends to be unstable. In some systems the instability of the plume disturbances is so significant that the solar panels (12 and 14, for example) must be oriented to a position whereby the plume torques acting on the panel are substantially reduced if not minimized. According to the invention, this problem is overcome to a great extent. In particular, as will be described, the invention provides for a mode of operating the thrusters with a wider range of solar array angular positions indicated by the angle $\alpha$.

Figure 5:
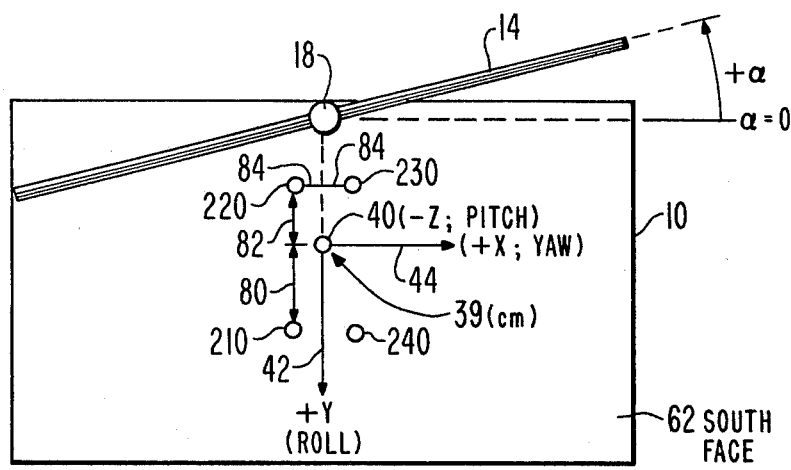
FIGS. 5 and 6 are schematics showing thrusters on one face of the spacecraft of FIG. 3 that are canted according to the invention.
Figure 6:
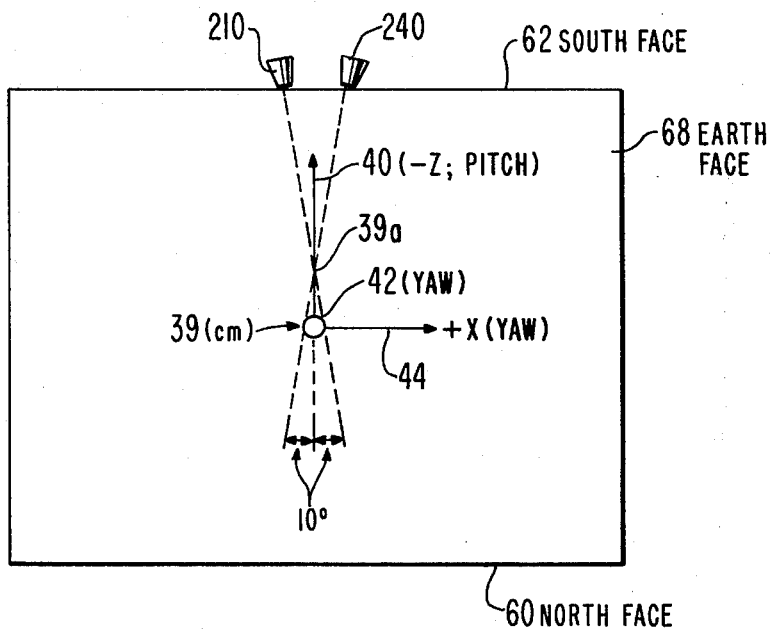

Referring to FIGS. 5 and 6, there is shown thrusters 210, 220, 230 and 240 mounted on the south face 62 of the spacecraft 10. The solar array panel 14 mounted to rotatable shaft 18 is at an angle $\alpha$ near the edge of the panel 62, in a similar relationship as shown in FIG. 3. The thrusters are disposed about the spacecraft axes in a generally asymmetric relationship although this is not essential to the invention. The spacing of the thrusters is as follows: thrusters 210 and 240 are spaced from the x axis 44 by a dimension 80 while the thrusters 220 and 230 are spaced from the x axis by a dimension 82. Each of the four thrusters is spaced from the y axis 42 by a dimension 84. In a typical system in which this invention may be practiced, the dimensions 80, 82 and 84 may be equal as, for example, illustrated in FIGS. 1 and 3. However, by spacing the thrusters such that dimension 80 is larger than the dimension 82, any bias plume torque acting on a solar panel can be reduced. Accordingly, in the preferred embodiment of a typical spacecraft embodying the present invention, in which the thrusters provide 0.1 pound (0.44 newtons) thrust, the dimensions 80, 82 and 84 are 6, 4 and 1 inches (152.4, 101.6 and 25.4 mm), respectively, on a center-to-center basis with respect to the nozzle axes.

The shorter moment arms 82 for thrusters 220 and 230 about the x axis 44 acting with the respective longer moment arms 80 for thrusters 210 and 240 about the same axis 44 provide a positive bias yaw control torque to compensate for the negative bias yaw disturbance torque induced by the thruster plume. This negative bias disturbance torque, as mentioned hereinabove, is due, it should be understood, to the solar array 14 being offset from the satellite center of mass 39.

In any system embodying the invention, such as shown in FIG. 6, for example, at least some of the thrusters are canted. Referring to FIG. 6, each of the thrusters 210 and 240 are canted in the x-z plane such that the line of thrust of the reaction or control force $F_c$ crosses at a point 39a above the center of mass 39 (see FIG. 6) to provide a control torque opposite in sign from that obtained from the thruster with no cant (as shown by, thrusters 21 and 24, FIG. 3).

The thrusters 210, 220, 230 and 240 are clustered as close as physically possible (the dimensions of the thruster structure being the spacing limitation) to the y axis 42 in order to minimize the cant necessary to obtain the required control torque. In the present embodiment, the cant for the thrusters is 10° with a minimum of two inches (50.8 millimeters) center-to-center between the thrusters. The 10° cant of the thrusters 210 and 240 provides roll control torques which are of the same algebraic sign as the plume-induced-roll disturbance torque when the array is in the position in which $\alpha$ is about 90°±10°. With this orientation, the plume-induced-roll torques acts as an aid to the control of the satellite rather than as a disturbance.

Thrusters 220 and 230 are similarly provided with a cant of 10° relative to the z (pitch axis), as are thrusters 210 and 240, to cause their respective force thrust vectors to cross the spacecraft axis at a point other than the center of mass 39. Furthermore, the north face 60 is provided with four thrusters (not shown) similarly arranged as thrusters 210, 220, 230 and 240 and similarly canted relative to the z axis 40. By such an arrangement the plume of such torquers on the north face aid the control of the satellite rather than causing a disturbance.

It should be noted that if the solar array 14 is not offset from the center of mass 39, there will be no, or very little, bias torque caused by the plume. Thus a system such as that shown in FIG. 1 will not develop any appreciable bias plume torques, whereas a system as illustrated in FIGS. 3, 5 and 6 as just described, will develop bias plume torques. The canting of thrusters may not necessarily utilize such bias torques to aid the control torques of the thruster. However, positioning the canted thrusters as illustrated and described for FIG. 5 will reduce the bias plume torque effect.

It should be understood that for a system in which the solar array is symmetrical with respect to the center of mass and the canted thruster array, as in FIG. 1, the rotational position of the solar array, defined by $\alpha$, can be at any angle. However, in systems in which the solar array is offset, as in FIG. 3, it is preferred that the rotational position of the solar array panel be such as to have its projection extend between the canted thrusters. Thus, for an offset array of the type shown in FIG. 5, $\alpha$ is preferably 90°±10°. It should be understood that the orientation of the array shown in FIG. 5 does not represent the preferred position. As the position of the solar array panel changes beyond the preferred range for an offset array, the disturbance torques caused by the plume may get significantly large. In some design configurations, even with canted thrusters, the plume torque may render the satellite control system unstable.

Figure 7:
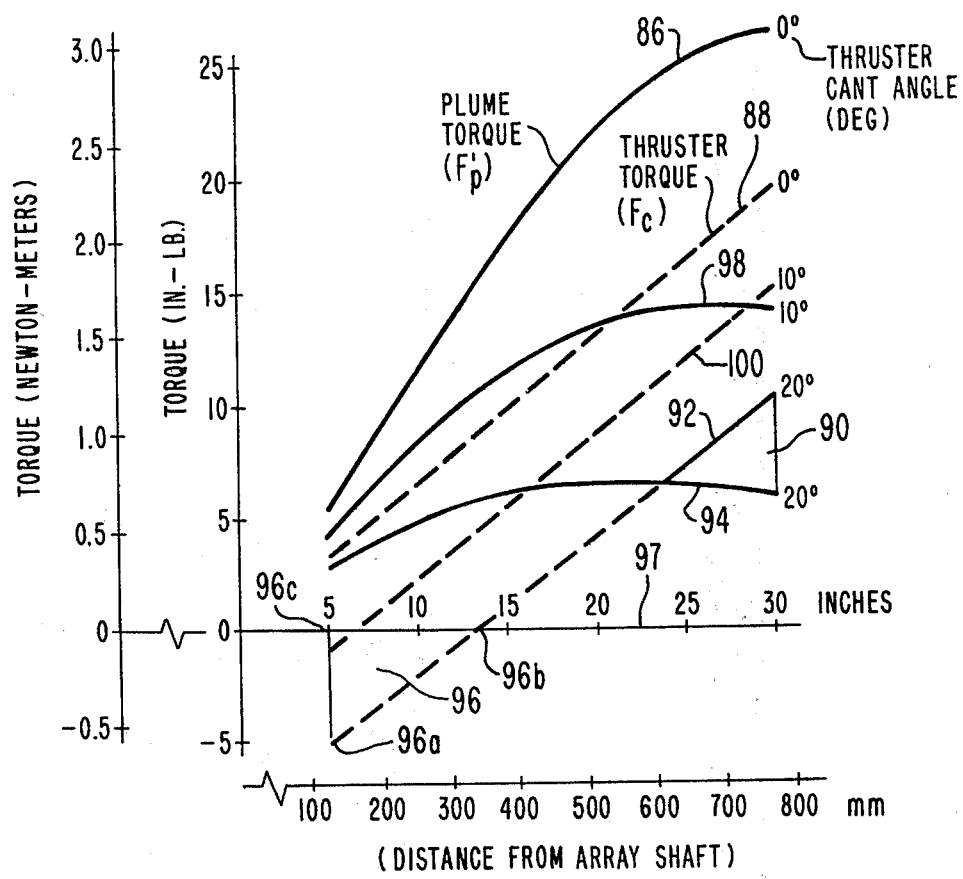
FIG. 7 is a curve plot (for convenience, using both Metric and English units) showing the relationship of the various thruster cant angles and the resultant plume and thruster torques illustrating the principle of the invention.

FIG. 7 shows the plot of the plume torque ($F'_p$) and thruster torque ($F_c$) for varying distances of a thruster position from the shaft axis (18) as represented by the solid line 86 and the dashed line 88, respectively, for a thruster having no cant angle. These relationships are based on a system such as illustrated in FIG. 1 in which the solar array panel 14 is symmetrical with respect to the thrusters 21-24 and the axis of the array shaft 18 is aligned with the z primary control axis. The analysis of the torques illustrated by FIG. 7 are, however, applicable to any configuration. The torque lines as plotted in FIG. 7 represent both positive and negative torques; the solid lines representing the plume torque ($F'_p$) are positive torques while the dashed lines above zero torque line 97 represents the control torques ($F_c$) which are negative torques. Note that the ordinate is scaled to include torques that are both positive and negative. Thus, the portion of the dashed line representing the control torque ($F_c$) below line 97 is understood to have a magnitude corresponding to the value indicated on the torque scale but of opposite algebraic sign or in other words these torques are positive torques. For example, by comparing the respective torques generated by the thruster and the plume, it is seen that for a thruster, having a nominal thrust of 0.65 pounds (2.89 newtons), positioned thirty inches (762.0 mm) from the shaft axis (14), the plume torque ($F'_p$) is about +26 inch-pounds (2.9 n-m) with a thruster torque ($F_c$) of −19.5 inch-pounds (2.20 newton-meters). Thus, for this configuration the plume torque dominates the thruster torque. This is a disturbance if one is depending on control torque that is intolerable. However, for the same configuration and angular position of the array with a thruster at a 10° cant at thirty inches from the shaft axis, the plume force is about +14 inch-pounds (1.58 newton-meters) and the thruster torque is about −15 inch-pounds (1.7 newton-meters) as seen from the curve plots 98 and 100, respectively. By providing a cant of 20° for the thruster at thirty inches (762 mm) from the shaft axis, the difference between the thruster and the plume torque is more acceptable.

If the thrusters are canted sufficiently and are located far enough from the spacecraft shaft axis (14) the control torque ($F_c$) is greater than that caused by the plume ($F'_p$). This relationship is illustrated by the portion 90 appearing to the right of where thruster torque line 92 crosses the plume torque line 94. For a suitable ratio of the control torque ($F_c$) to the plume torque ($F'_p$) that provides a stable system, suitably a ratio of 1.5 additional cant angle of the thrusters or more distance (from the shaft axis 14) would be required for the thruster. Such geometric structural conditions are very restrictive since the thruster can only be so far from the shaft axis (14) of the spacecraft from a system design viewpoint. Too much cant of the thruster reduces significantly the efficiency of the thruster if it is to be used for anything other than control. By keeping the thruster close to the shaft axis and canting the thruster, the algebraic sign of the control torque ($F_c$) is reversed. This effect is represented by the portion 96 defined by the torque line 92 and the zero torque line 97. Thus, with the plume torque ($F'_p$) and the control torque ($F_c$) effectively aiding each other, the total or net torque may vary in magnitude but the relative sign remains the same thus providing a stable attitude control system. Although there exists two general regions, namely regions 90 and 96 in which suitable spacecraft control can be achieved, the range represented by the area 96 provides a system in which the plume torques aid, according to the invention, rather than counteract (as in region 90) the control torque or stated another way in the region where the control torque, if any, aids the plume torque. Region 96 is defined by the line portions between points 96a and 96b and 96c. The zero torque line 97 is associated with a thruster positioned to act through a particular body axis. For example, it may be associated with a thruster which is canted to generate a reaction force described by a line of thrust which passes through the center of mass of or a primary control axis of, the spacecraft, whereby the only torque resulting from said thruster is the plume torque. The apparently abrupt ending of the curves of FIG. 7 represent the actual structural positional limit of the thruster with respect to the shaft axis. It should be understood that the principle of the invention is not limited to such a limiting design.

The operation of the thrusters should be apparent from the description given hereinabove. In summary, when one or more appropriately canted thrusters are operated, the plume torques from such thrusters impinging on surfaces of the solar panels, which otherwise would caused disturbances to the desired control torques, aid the control torques in the attitude control and orientation maneuvers of the spacecraft.

What is claimed is:

1. An attitude control system for a spacecraft of the type having jet type thrusters for orbit adjustment and attitude control maneuvers, a structure having a surface disposed in the thruster exhaust plume of at least one of said thrusters so that said one thruster exhaust plume impinges on said structure to develop a plume torque in a given direction with respect to one of the spacecraft's three primary control axes, hereinafter termed said one axis, to rotate said spacecraft in said given direction about said one axis and so that said one thruster generates a reaction force to develop a control torque about said one axis and a control system for operating said thruster to control the attitude about said one axis or to change the orbit position of said spacecraft, comprising:

said one thruster being spaced from the said structure and canted relative to a second of said spacecraft primary axes orthogonal to said one axis, hereinafter termed said second axis, to direct its reaction line of thrust to cross said second axis at said one axis or on the thruster side of said one axis to develop said control torque in only said given direction about said one axis, when said line of thrust does not pass through said one axis, such that the resultant torque about said one axis is caused by said control torque aiding said plume torque.

2. A system according to claim 1 wherein said one thruster is canted relative to said second axis to generate a reaction line of thrust in a direction that crosses said second axis on the thruster side of said one axis such that said control torque produced by said one thruster has the same sense of rotation as the rotation caused by said plume torque.

3. A system according to claim 1 wherein said one thruster is canted to generate a reaction line of thrust which passes through the center of mass of said spacecraft, whereby the only torque resulting from said thruster is said plume torque.

4. A system according to claim 1 wherein said structure is mounted along a given axis parallel to but not coincident with said second axis, and wherein exhaust plumes of a given plurality of said thrusters including said one thruster impinge on the surface of said structure to generate a bias torque in said given direction about said one axis which is transverse to said given axis, and wherein each of said thrusters in said plurality is positioned on said spacecraft so that the respective reaction torques tend to offset said bias torque.

5. A system according to claim 1 wherein said one thruster is disposed to cause its reaction line of thrust to pass through said one axis of said spacecraft, whereby the control torque produced by said one thruster is zero magnitude so that the only torque resulting from said thruster is said plume torque.

* * * * *